United States Patent [19]

Komaroff et al.

[11] 4,165,635
[45] Aug. 28, 1979

[54] METHOD OF TESTING FUEL-INJECTOR SPRAY NOZZLES

[75] Inventors: Ivan Komaroff, Regensburg; Viktor Schatz, Gerlingen, both of Fed. Rep. of Germany

[73] Assignee: Robert Bosch GmbH, Stuttgart, Fed. Rep. of Germany

[21] Appl. No.: 944,374

[22] Filed: Sep. 21, 1978

[30] Foreign Application Priority Data

Dec. 24, 1977 [DE] Fed. Rep. of Germany ....... 2757966

[51] Int. Cl.² ........................................... G01M 15/00
[52] U.S. Cl. .................................................. 73/119 A
[58] Field of Search ..................... 73/119 A, DIG. 11; 250/564, 573; 364/481, 509

[56] References Cited

U.S. PATENT DOCUMENTS 3,164,012   1/1965   Childs ................................ 73/119 A

FOREIGN PATENT DOCUMENTS 1533819   7/1968   France .................................. 73/119 A

*Primary Examiner*—Jerry W. Myracle
*Attorney, Agent, or Firm*—Michael J. Striker

[57] ABSTRACT

A laser beam is directed onto a light detector along a path passing close to the spray orifice(s) of a fuel-injector spray nozzle. The photoelectric signal produced by the light detector is fed to an automatic signal-content evaluating unit. To test the nozzle for proper buzzing, fuel is applied to the nozzle at a predetermined pressure and volumetric flow rate preferably corresponding to those for which the nozzle is designed. If the nozzle buzzes properly the photoelectric signal is pulsating, otherwise continuous. To test the nozzle for seal-tightness, fuel is applied to the nozzle for a limited testing interval at a pressure lower by a predetermined amount than the opening pressure of the spray nozzle. If the nozzle is insufficiently seal-tight, drops of fuel are discharged from the spray orifice(s) resulting in corresponding alteration of the photoelectric signal. The automatic signal-content evaluating unit evaluates the photoelectric-signal content with respect to amplitude and frequency or pulse duration.

5 Claims, 1 Drawing Figure

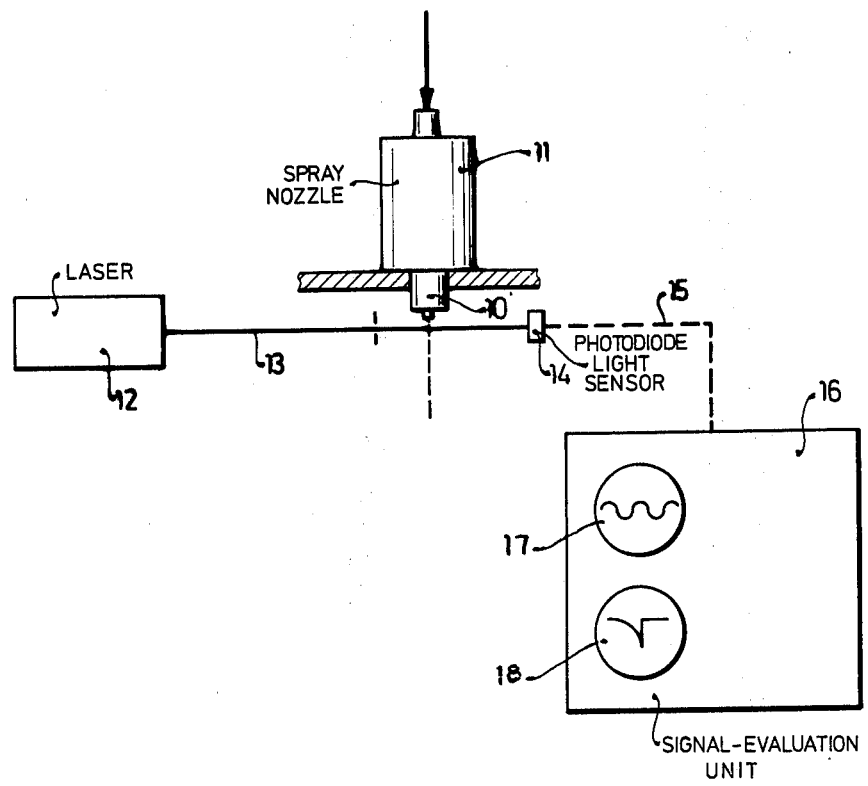

METHOD OF TESTING FUEL-INJECTOR SPRAY NOZZLES

BACKGROUND OF THE INVENTION

The present invention relates to the testing of nozzles, particularly for example spray nozzles such as used in fuel-injection systems, with respect to proper buzzing and seal-tightness. Typically, spray nozzles, such as used in fuel-injection systems, are tested with respect to proper buzzing and seal-tightness by laborious techniques, most often relying mainly on visual observation, which place heavy demands upon testing personnel.

SUMMARY OF THE INVENTION

It is a general object of the invention to simplify the testing of spray nozzles in these respects, even to an extent permitting fully automated testing of the nozzles.

According to the invention, this is achieved as follows. A laser beam is directed onto a light detector along a path passing close to the spray orifice(s) of the spray nozzle. The photoelectric signal produced by the light detector is applied to an electronic signal-evaluating unit which, by evaluating the photoelectric signal with respect to relatively simple characteristics, indirectly evaluates the operation of the spray nozzle with respect to seal-tightness below nozzle-valve opening pressure and with respect to proper nozzle buzzing.

Using this technique, the testing of the spray nozzles, e.g., fuel-injection spray nozzles, can be performed very simply, fully automatically, and with a very high degree of accuracy.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE schematically depicts how the method of the present invention is performed.

DESCRIPTION OF THE PREFERRED EMBODIMENTS

The single FIGURE schematically depicts a setup for performing the testing of fuel-injection spray nozzles in accordance with the present invention. A laser 12 directs a laser beam 13 onto a light detector 14, e.g., a photodiode light detector, along a path passing close to the spray orifice(s) 10 of a fuel-injection spray nozzle 11. The photoelectric signal generated by the light detector 14 is applied via an electrical line 15 to the input of a signal-evaluation unit 16 capable of evaluating the photoelectric signal with respect to proper nozzle buzzing and with respect to nozzle seal-tightness below nozzle-valve opening pressure.

To test the nozzle with respect to proper buzzing, fuel is fed to the nozzle (as indicated by the arrow) at a predetermined constant pressure and predetermined constant volumetric flow rate, preferably the pressure and flow rate for which the nozzle has been designed. If the nozzle is operating properly, the fuel discharged from the nozzle spray orifice(s) will pulsate or buzz, whereas if the nozzle is defective the discharge will be non-pulsating and continuous. If the nozzle is buzzing properly, the photoelectric signal furnished to signal-evaluation unit 16 will exhibit corresponding pulsation; if the nozzle is not operating properly, the photoelectric signal furnished to unit 16 will be substantially non-pulsating or continuous. Signal-evaluating unit 16, essentially, discriminates between pulsating and non-plusating signals, and if the latter are detected generates a visible indication or an automatic discard signal for the defective nozzle. It will be understood that circuitry capable of discriminating between pulsating and non-pulsating signals is per se elementary in the electronic circuit art.

In addition to discrimination between pulsating and non-pulsating signals, the circuitry employed in signal-evaluation unit 16 can also be selected, if desired, to distinguish between ranges of pulsation frequency, and/or ranges of pulsation amplitude, and/or ranges of pulse duration. Unit 16 is provided with a first monitor 17, on which the received photoelectric signal is displayed for nozzle buzz testing. This facilitates monitoring of the operation of the testing system and setting-up and occasional adjustment of the testing system.

To test the nozzle with respect to seal-tightness, fuel is fed to the nozzle for a predetermined limited testing interval, e.g., 10 seconds, at a constant pressure whose magnitude is lower by a predetermined amount, e.g., 10 bar, than the opening pressure of the spray nozzle's valve. If the seal-tightness of the nozzle is good, then no drops of fuel should be emitted from the spray orifice(s) of the nozzle during the tesing interval. Accordingly, if the nozzle is good and no drops of fuel are discharged into the path of the laser beam 13, the photoelectronic signal applied to signal-evaluation unit 16 will be without signal content. If the nozzle is inadequately seal-tight, the laser beam will be at least partly interrupted by each discharged drop of fuel, which will make itself felt in the photoelectric signal applied to unit 16. Unit 16 accordingly includes circuitry capable of detecting the presence of signal alterations resulting from improper discharge of drops of fuel and, if desired, counting or quantitatively evaluating such fuel-drop discharges. Unit 16 is provided with a second monitor 18, on which is displayed the received photoelectric signal during testing for seal-tightness. Here again, if the evaluation of the photoelectric signal indicates defective nozzle operation, a visual indication and/or an automatic discard signal or the like can be generated.

For both tests, the amplitude and frequency or pulse duration of the signal content is evaluated. Of course, the criteria which the evaluating circuitry is to be governed by, will be established in dependence upon the particular nozzle design involved, for example by testing good and defective nozzles of a given design after performing visual observation of nozzle buzzing and seal-tightness.

It will be understood that each of the elements described above, or two or more together, may also find a useful application in other types of techniques differing from the types described above.

While the invention has been illustrated and described as embodied in a method for testing fuel-injector spray nozzles with respect to proper buzzing and seal-tightness, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of testing fuel-injector spray nozzles, comprising directing a laser beam onto a light detector along a beam path passing close to the spray orifice(s) of the nozzle to form a photoelectric signal and applying the photoelectric signal to an electronic signal-evaluation unit operative for evaluating the content of the signal and thereby evaluating the operation of the nozzle.

2. A method as defined in claim 1, using for the light detector a photodiode.

3. A method as defined in claim 1, furthermore comprising generating a visible analog display of the content of the photoelectric signal.

4. A method as defined in claim 1, evaluating the nozzle with respect to proper buzzing by applying liquid to the nozzle at a predetermined pressure and at a predetermined volumetric flow rate, whereby proper buzzing of the nozzle during spray discharge of the liquid will cause the light detector to produce a pulsating photoelectric signal.

5. A method as defined in claim 1, evaluating the nozzle with respect to seal-tightness by applying liquid to the nozzle for a limited predetermined testing interval at a predetermined pressure lower than the opening pressure of the nozzle, whereby imperfect seal-tightness of the nozzle will result in the discharge of drops from the nozzle and corresponding alteration of the photoelectric signal produced by the light detector.

* * * * *